United States Patent [19]

Niehaus et al.

[11] 4,399,517

[45] Aug. 16, 1983

[54] MULTIPLE-INPUT BINARY ADDER

[75] Inventors: Jeffrey A. Niehaus, The Colony; Kevin M. Ovens, Garland, both of Tex.

[73] Assignee: Texas Instruments Incorporated, Dallas, Tex.

[21] Appl. No.: 245,480

[22] Filed: Mar. 19, 1981

[51] Int. Cl.³ .................................................. G06F 7/50
[52] U.S. Cl. ..................................... 364/784; 364/786
[58] Field of Search ......................... 364/784, 785, 786

[56] References Cited

U.S. PATENT DOCUMENTS

| | | | |
|---|---|---|---|
| 3,515,344 | 6/1970 | Goldschmidt et al. | 364/786 |
| 3,535,502 | 10/1970 | Clapper | 364/786 X |
| 3,603,776 | 9/1971 | Weinberger | 364/786 |
| 3,636,334 | 1/1972 | Svoboda | 364/786 |
| 3,675,001 | 7/1972 | Singh | 364/786 |
| 3,711,692 | 1/1973 | Batcher | 364/786 |
| 3,723,715 | 3/1973 | Chen et al. | 364/786 |

OTHER PUBLICATIONS

Singh, "Fast Adder for Multinumber Addition", *IBM Tech. Disclosure Bulletin*, vol. 15, No. 9, Feb. 1973, pp. 2939-2940.

Kobayashi et al., "A Synthesis Method for Multiple Input Adders with a ROM Network", *Systems-Computers-Controls*, vol. 10, No. 1, 1979, pp. 9-16.

*Primary Examiner*—David H. Malzahn
*Attorney, Agent, or Firm*—Peter J. Rhoma; N. Rhys Merrett; Melvin Sharp

[57] ABSTRACT

An improved 6-input adder is disclosed. The adder decodes pairs of inputs to provide three sets of NAND, NOR and Exclusive OR terms which are inputted to AND-OR-INVERT arrays which generate first and second carry output terms of a 3-bit binary number in less than three gate delays.

7 Claims, 16 Drawing Figures

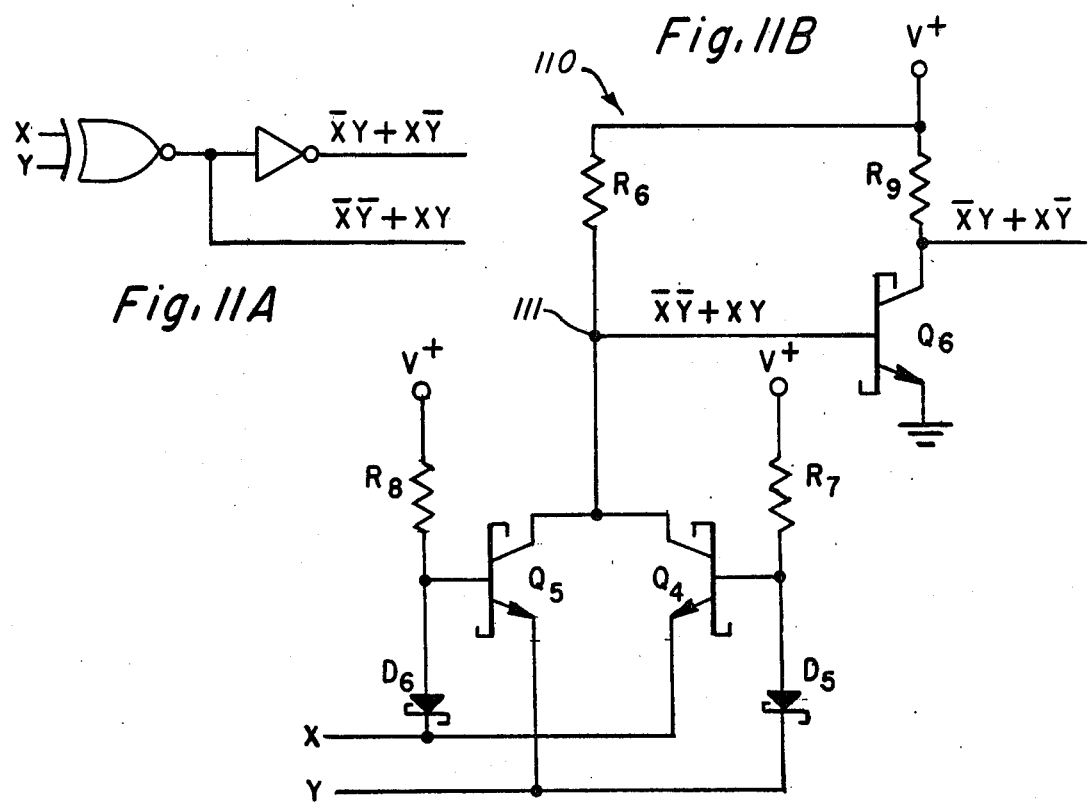
Fig. 11A
Fig. 11B
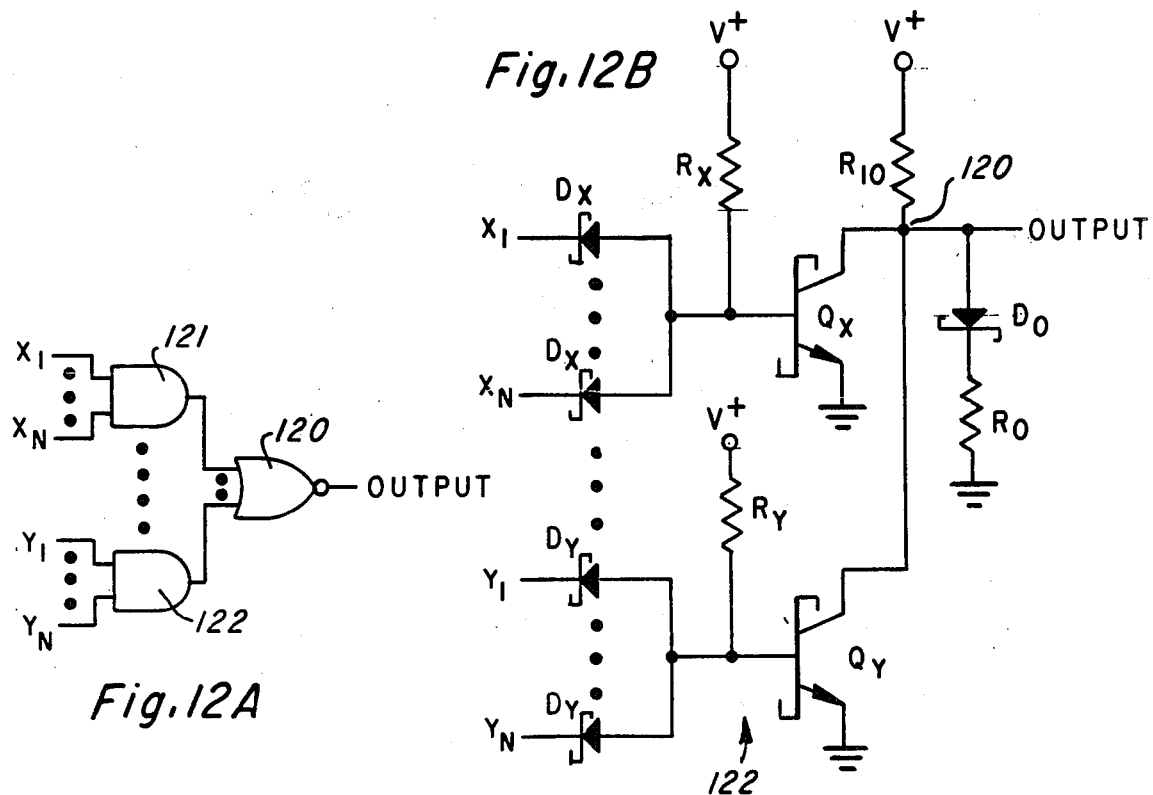
Fig. 12A
Fig. 12B

MULTIPLE-INPUT BINARY ADDER

The present invention pertains generally to semiconductor devices and more particularly to digital integrated circuits for performing high-speed arithmetic operations.

High-speed multiplication in digital circuits is limited by the speed of addition of partial products. FIG. 1 illustrates by way of example the block diagram for an adder having six binary inputs of equal weight A-F which produce a 3-bit binary number $C_2$, $C_1$, $\Sigma$. Such an adder can be implemented using conventional logic by means of three full adders (FA) and one half adder (HA) each generating sum $S_0$ and carry $C_0$ terms to generate the required 3-bit binary number in accordance with the circuit of FIG. 2. The carry terms of each full adder can be generated in two gate delays using NOR logic gates. Thus, it requires at least four gate delays to generate the $C_2$ output term in FIG. 2, since the half adder causes some additional delay. For purposes of this specification, a gate delay will be defined generally as the time it takes a NAND logic gate to switch states and assumes that a NOR logic gate requires a small fraction of a gate delay longer than a NAND logic gate to switch states.

In another implementation of the 6-input adder of FIG. 1, each input and its complement are fed to an array of AND gates whose outputs are then ORed and inverted to generate the $C_1$ and $C_2$ output terms. The practical application of such a circuit requires each input to be inverted to generate its complement which is then inverted to regenerate the true input so that an amplified true input is available to fan out to a relatively large number of AND gates. Those skilled in the art will appreciate that such a logic circuit requires at least three gate delays consisting of two inverters and one AND gate in series in order to generate the carry output terms $C_1$ and $C_2$.

The present invention has for its principal object the provision of an improved multiple-input adder for generating a binary coded output with a minimum number of gate delays and a minimum fan-in on the inputs. Other objects and advantages of the present invention will become apparent upon consideration of a preferred embodiment thereof as will now be described with reference to the accompanying drawings, in which:

FIG. 11A depicts an Exclusive OR logic circuit of the type employed in the decoders of FIGS. 3-5;

FIG. 11B is a preferred circuit implementation of the logic circuit of FIG. 11A;

FIG. 12A is a generalized AND-OR-INVERT array of the type employed in FIGS. 6 and 7; and FIG. 12B is a preferred circuit implementation of the array of FIG. 12A.

The following tables are provided to assist in the understanding of the operation of the present invention:

TABLE I

| Sum A-F | $C_2$ | $C_1$ | $\Sigma$ |
| --- | --- | --- | --- |
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |

TABLE II

| Sum A-F | f(A,B) | f(C,D) | f(E,F) |
| --- | --- | --- | --- |
| 0 or 1 | 0 | 0̲ | 2̄ |
| 0 or 1 | 0̲ | 2 | 0 |
| 0 or 1 | 2 | 0 | 0̲ |
| 4 or 5 | 2 | 2̲ | 2 |
| 4 or 5 | 2̲ | 2 | 2 |
| 4 or 5 | 2 | 2 | 2 |
| 4 | 1 | 1 | 2 |
| 4 | 1 | 2 | 1 |
| 4 | 2 | 1 | 1 |

TABLE III

| Sum A-F | g(A,B) | g(C,D) | g(E,F) |
| --- | --- | --- | --- |
| 0–3 | 0 | 2̄ | X̲ |
| 0–3 | 0̲ | X | 2̲ |
| 0–3 | 2 | 0 | X̲ |
| 0–3 | X̲ | 0 | 2̲ |
| 0–3 | 2 | X̲ | 0 |
| 0–3 | X | 2 | 0 |
| 3 | 1 | 1 | 1 |

Figure 1:
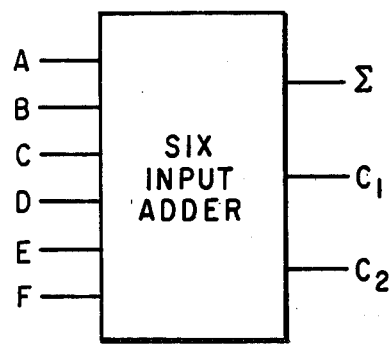
FIG. 1 is a generalized block diagram of a 6-input adder.
Figure 2:
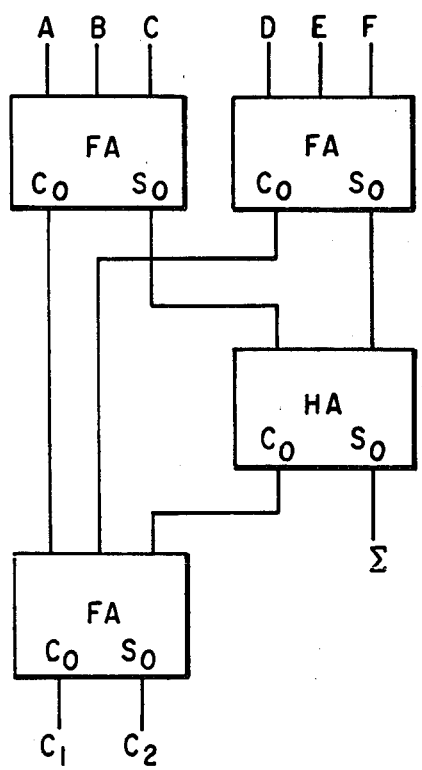
FIG. 2 is a block diagram of a prior-art implementation of the 6-input adder of FIG. 1.

Table I is a truth table for the 6-input adder of FIG. 1. The leftmost column designated Sum A-F lists the seven different possible sums in decimal notation of the number of 1's in the six inputs A-F. The three other columns designated $C_2$, $C_1$ and $\Sigma$ together represent the binary equivalent of the number in the leftmost column. The present invention employs logic circuits which generate the $C_2$, $C_1$ and $\Sigma$ terms by decoding pairs of inputs selected from the A-F group of inputs to generate intermediate output terms which are then further decoded to generate the $C_2$, $C_1$ and $\Sigma$ terms, all with a minimum of gate delays as will presently be described.

Figure 3:
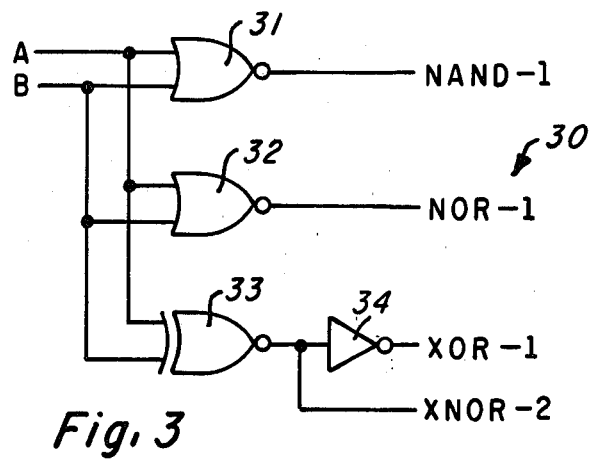
FIGS. 3-5 depict three decoders which together define a first-level decode circuit for the 6 inputs of FIG. 1.
Figure 4:
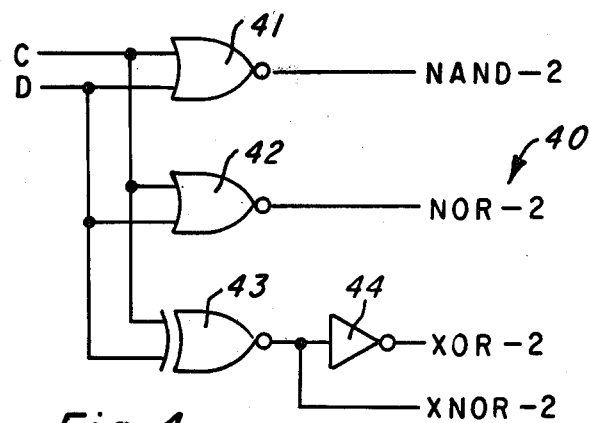
Figure 5:
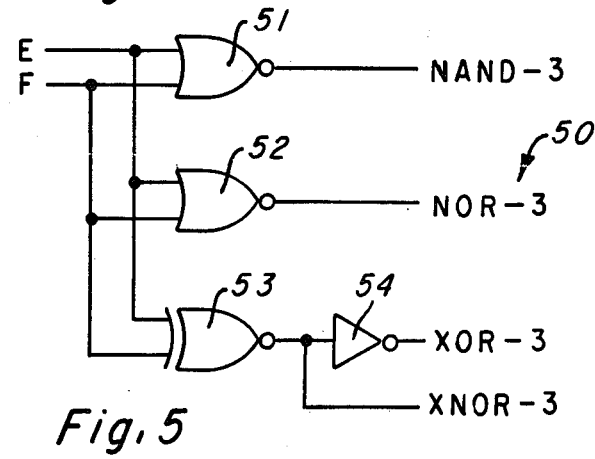

Referring to FIGS. 3-5, a first-level decode circuit in accordance with the present invention will now be described. FIG. 3 shows a decoder 30 having gates 31, 32 and 33 and an inverter 34 which operate on the A and B inputs to generate four intermediate output terms NAND-1, NOR-1, XOR-1 and XNOR-1. The notations XOR and XNOR are used herein as abbreviations for the complementary terms Exclusive OR and Exclusive NOR. The NAND-1 term will be a logic 1 whenever the sum of the A and B inputs is not 2. The NOR-1 term will be a logic 1 whenever the sum of the A and B inputs is 0. The XOR-1 term will be a logic 1 whenever the sum of the A and B inputs is 1. The XNOR-1 term will be a logic 1 whenever the sum of the A and B inputs is either 0 or 2. FIGS. 4 and 5 show similar decoders 40 and 50 with similarly numbered gates. The decoders 40 and 50 operate respectively on the C,D pair and E,F pair of inputs to generate respective intermediate output terms NAND-2, NOR-2, XOR-2, XNOR-2, NAND-3, NOR-3, XOR-3 and XNOR-3.

It will become apparent from the description of the circuits of FIGS. 6 and 7 below that the carry terms can be generated according to the invention in a minimum number of gate delays using logic based on the occurrences of zeros in Table I. From Table I it is evident that the $C_1$ output term is 0 whenever the sum of the A-F inputs is either 0, 1, 4 or 5. All possible combinations of the A-F inputs which produce a 0, 1, 4 or 5 sum can be generated from the intermediate output terms in combination with the A-F inputs as will now be described with reference to Table II.

Table II is a table of permutations for $C_1=0$, in which there are four columns designated Sum A-F, f(A,B), f(C,D) and f(E,F) wherein f(A,B) is a function of the A,B pair of inputs and their intermediate output terms generated from the circuit 30 of FIG. 3, f(C,D) is a function of the C,D pair of inputs and their intermediate output terms generated from the circuit 40 of FIG. 4 and f(E,F) is a function of the E,F pair of inputs and their intermediate output terms generated from the circuit 50 of FIG. 5. By way of example, the first line of Table II indicates that a sum of 0 or 1 for the A-F inputs will be generated when f(A,B)=0, f(C,D)=0 and f(E,F)=$\overline{2}$. The designation $\overline{2}$ is used to mean not 2 (i.e., either 0 or 1). Thus, it will be apparent from the first line of Table II that $C_1=0$ will occur whenever the AND of NOR-1, NOR-2, and NAND-3 generates a logic 1. The remaining eight lines of Table II list the other possible combinations of f(A,B), f(C,D) and f(E,F) that result in $C_1=0$.

Now referring to FIG. 6, an AND-OR-INVERT array for implementing the relationships in Table II will be described. The circuit of FIG. 6 employs a plurality of AND gates whose outputs are connected to an OR-INVERT gate 60. AND gate 61 provides the logic equivalent of line 1 of Table II as described in the previous paragraph. Similarly, AND gates 62 and 63 provide the logic equivalents of the other combinations of A-F which produce a sum of 0 or 1 as defined by the pair functions of lines 2 and 3 of Table II. AND gate 64 provides the logic equivalent of line 4 of Table II which indicates that a sum of 4 or 5 will result when f(A,B)=2, f(C,D)=2, and f(E,F)=$\overline{2}$. The result f=2 occurs when both inputs of a particular pair equal 1. Thus, for example, f(A,B)=2 occurs when A=1 and B=1. It will therefore be appreciated that the single 5-input AND gate 64 provides the logic equivalent of the three possible A-F combinations (i.e., 111100, 111101 and 111110) which are defined by the pair of functions of line 4 of Table II. Similarly, AND gates 65 and 66 provide the logic equivalents of the other A-F combinations which produce a sum of 4 or 5 as defined by the pair functions of lines 5 and 6 of Table II. Lines 7, 8 and 9 of Table II define three additional sets of pair functions which produce sums of 4. For example, line 7 defines the four possible A-F combinations wherein the sum of A and B is 1, the sum of C and D is 1, and the sum of E and F is 2 (i.e., 010111, 011011, 100111 and 101011). The 4-input AND gate 67 is therefore the logic equivalent of line 7 of Table II. Likewise AND gates 68 and 69 are the logic equivalents of lines 8 and 9 of Table II. Since Table II identifies all combinations of the A-F inputs that can occur when $C_1=0$, ORing the outputs of the AND gates 61-69 would produce a logic 1 output whenever the sum of the A-F inputs equals 0, 1, 4 or 5. However, since Table I requires a logic 0 output for $C_1$ whenever such a sum exists, it is necessary to OR the outputs of the AND gates 61-69 and then invert that result to generate the true $C_1$ output term. This is achieved by the OR-INVERT gate 60. It will therefore be appreciated that the AND-OR-INVERT array of FIG. 6 generates the desired truth-table relationship for $C_1$ as defined in Table I.

Referring again to Table I, it will be apparent that the $C_2$ term is 0 whenever the sum of the A-F inputs is either 0, 1, 2 or 3. All possible combinations of the A-F inputs which produce a 0, 1, 2 or 3 sum can be generated from the intermediate output terms provided by the decoders 30, 40 and 50 of FIGS. 3-5 as will now be described with reference to Table III.

Table III is a table of permutations for $C_2=0$, in which there are four columns designated Sum A-F, g(A,B), g(C,D) and g(E,F) wherein g(A,B) is a function of the intermediate output terms generated from the circuit 30 of FIG. 3, g(C,D) is a function of the intermediate output terms generated from the circuit 40 of FIG. 4, and g(E,F) is a function of the intermediate output terms generated from the circuit 50 of FIG. 5. By way of example, the first line of Table III indicates that a sum of 0, 1, 2 or 3 for the A-F inputs will be generated when g(A,B)=0, g(C,D)=$\overline{2}$ and g(E,F)=X. The designation X is used to indicate that the respective pair of inputs can assume any possible state, or, in other words, that their sum can be 0, 1 or 2. Thus, it will be apparent from the first line of Table III that $C_2=0$ will occur whenever the AND of NOR-1 and NAND-2 generates a logic 1. The remaining six lines of Table III list the other possible combinations of g(A,B), g(C,D) and g(E,F) that result in $C_2=0$.

Now referring to FIG. 7, an AND-OR-INVERT array for implementing the relationships in Table III will be described. The circuit of FIG. 7 employs a plurality of AND gates whose outputs are connected to an OR-INVERT gate 70. AND gate 71 provides the logic equivalent of line 1 of Table III as described in the previous paragraph. Similarly, AND gates 72-76 provide the logic equivalents of the other combinations of A-F which produce a sum of 0, 1, 2 or 3 as defined by the pair of functions of lines 2-6 of Table III. AND gate 77 provides the logic equivalent of line 7 of Table III which defines an additional set of pair functions which produce a sum of 3. Since Table III identifies all combinations of the A-F inputs that can occur when $C_2=0$, ORing the outputs of the AND gates 71-77 would produce a logic 1 output whenever the sum of the A-F inputs=0, 1 2 or 3. However, since Table I requires a logic 0 output for $C_2$ whenever such a sum exists, it is necessary to OR the outputs of the AND gates 71-77 and then invert that result to generate the $C_2$ output term. This is achieved by the OR-INVERT gate 70. It will therefore be appreciated that the AND-OR-INVERT array of FIG. 7 generates the desired truth-table relationship for $C_2$ as defined in Table I.

Figure 8:
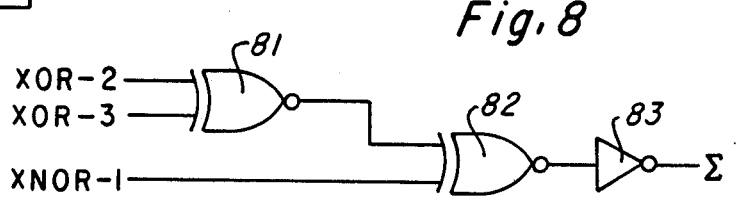
FIG. 8 is a parity tree forming another part of a second-level decode circuit for generating the $\Sigma$ output term of FIG. 1.

Now referring to FIG. 8, a parity tree 80 for forming the $\Sigma$ output term will be described. The parity tree 80 operates on the XNOR-1, XOR-2 and XOR-3 intermediate output terms of the decoders 30, 40 and 50 of FIGS. 3-5. The parity tree 80 comprises first and second 2-input Exclusive NOR gates 81 and 82 and an inverter 83 at the output of gate 82. The output of gate 81 forms one input to gate 82. The XNOR-1 term forms the other input to gate 82 and the XOR-2 and XOR-3 terms form the inputs to gate 81. Those skilled in the art will appreciate that the output of inverter 83 will be a logic 1 whenever the sum of the A-F inputs is an odd number, this satisfying the truth-table relationship for $\Sigma$ as defined in Table I.

Figure 9A:
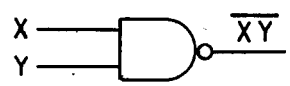
FIG. 9A is a NAND gate of the type employed in the decoders of FIGS. 3-5.
Figure 9B:
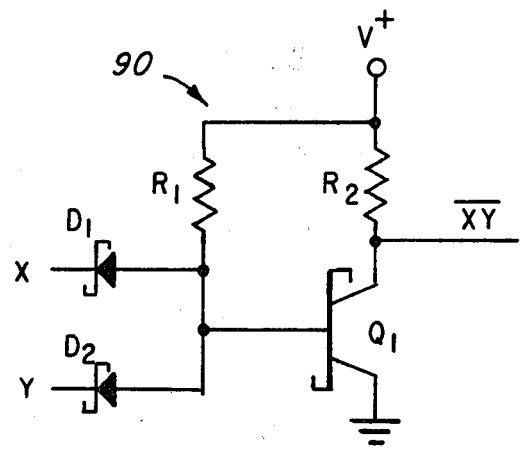
FIG. 9B is a preferred circuit implementation of the logic gate of FIG. 9A.

FIG. 9A is a NAND gate of the type employed in the decoders of FIGS. 3-5. FIG. 9B illustrates the presently preferred circuit 90 for implementing the NAND gate of FIG. 9A. The circuit 90 includes a Schottky-clamped NPN transistor $Q_1$ whose emitter is grounded and whose collector forms the NAND output ($\overline{XY}$) for X and Y inputs. Schottky diodes $D_1$ and $D_2$ connect the X and Y inputs to the base of the transistor at $Q_1$ and biasing resistors $R_1$ and $R_2$ connect the base and collector to a positive voltage source V+.

Figure 10A:
FIG. 10A is a NOR gate of the type employed in the decoders of FIGS. 3-5.
Figure 10B:
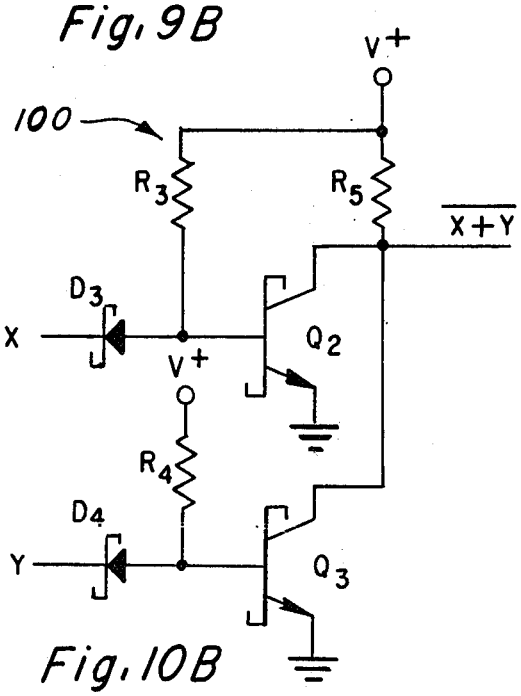
FIG. 10B is a preferred circuit implementation of the logic gate of FIG. 10A.

FIG. 10A is a NOR gate of the type employed in the decoders of FIGS. 3-5. FIG. 10B illustrates the presently preferred circuit 100 for implementing the NOR gate of FIG. 10A. The circuit 100 includes Schottky-clamped NPN transistors $Q_2$ and $Q_3$ whose emitters are grounded and whose collectors are connected in common to form the NOR output ($\overline{X+Y}$) for the X and Y inputs. A first Schottky diode $D_3$ connects the X input to the base of transistor $Q_2$ and a second Schottky diode $D_4$ connects the Y input to the base of transistor $Q_3$. Resistors $R_3$, $R_4$ and $R_5$ connect the bases of transistors $Q_2$ and $Q_3$ and their common collectors to the V+ source.

FIG. 11A depicts an Exclusive OR logic circuit of the type employed in the decoders of FIGS. 3-5. FIG. 11B illustrates the presently preferred circuit 110 for implementing the logic circuit of FIG. 11A. The circuit 110 includes Schottky-clamped NPN transistors $Q_4$, $Q_5$ and $Q_6$. The collectors of transistors $Q_4$ and $Q_5$ are connected to a common node 111 which drives the base of transistor $Q_6$. Node 111 defines the Exclusive NOR output ($\overline{X}\overline{Y}+XY$) for X and Y inputs. The emitter of transistor $Q_4$ forms the X input and the emitter of transistor $Q_5$ forms the Y input to the circuit 110. A first Schottky diode $D_5$ connects the base of transistor $Q_4$ to the emitter of transistor $Q_5$. A second Schottky diode $D_6$ connects the base of transistor $Q_5$ to the emitter of transistor $Q_4$. The emitter of transistor $Q_6$ is connected to ground and its collector defines the Exclusive OR output ($\overline{X}Y+X\overline{Y}$) of the circuit 110. Resistors $R_6$, $R_7$ and $R_8$ connect the bases of transistors $Q_4$, $Q_5$ and $Q_6$ to the V+ source and resistor $R_9$ connects the collector of transistor $Q_6$ to the V+ source. The relative values of the resistors are selected to provide appropriate biasing for the transistors in accordance with known techniques.

In accordance with an important feature of the invention, the circuit 110 of FIG. 11B effectively performs the Exclusive NOR logic operation ($\overline{X}\overline{Y}+XY$) in a fraction of one gate delay since node 111 represents a relatively small capacitance which operates over a relatively small voltage swing.

Figure 6:
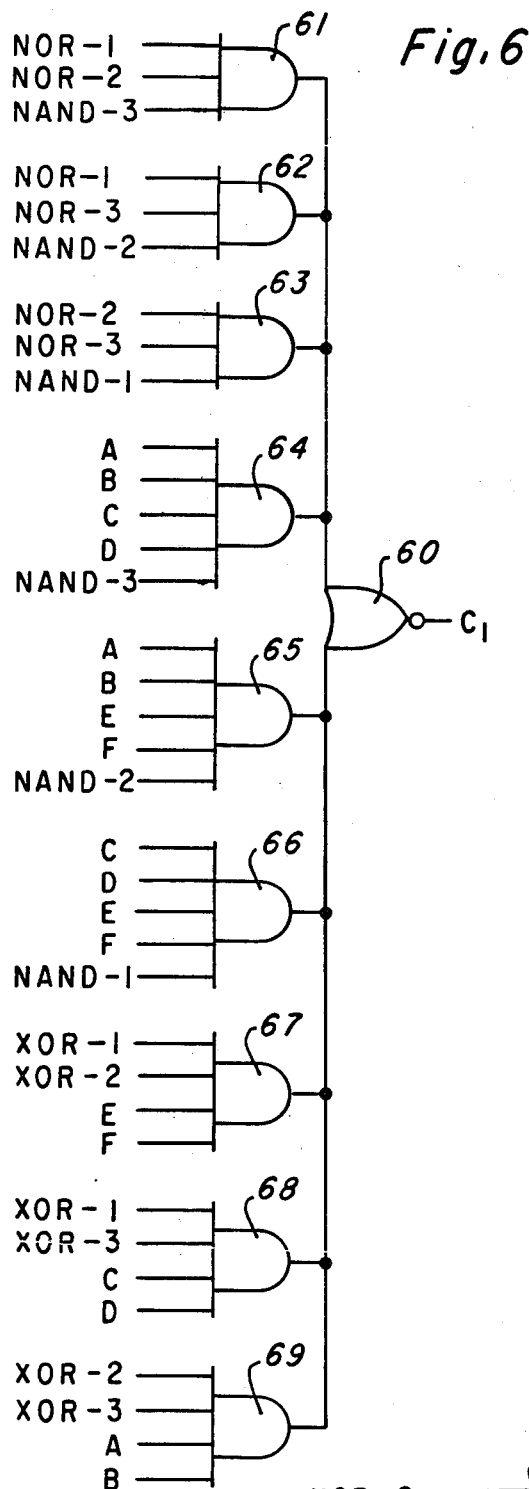
FIG. 6 is an AND-OR-INVERT array forming one part of a second-level decode circuit for generating the $C_1$ output term of FIG. 1.
Figure 7:
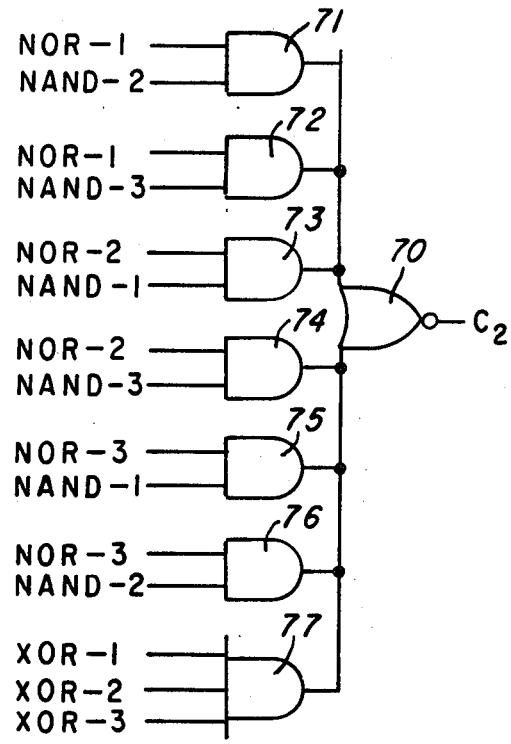
FIG. 7 is an AND-OR-INVERT array forming another part of a second-level decode circuit for generating the $C_2$ output term of FIG. 1.

FIG. 12A is a generalized AND-OR-INVERT array of the type employed in FIGS. 6 and 7, and FIG. 12B illustrates the presently preferred circuit implementation thereof. The array of FIG. 12A includes AND gates 121 and 122 which are two of a plurality of similar AND gates whose outputs form inputs to an OR-INVERT gate 120. Each of the AND gates has a plurality of inputs as indicated by inputs $X_1$-$X_N$ to AND gate 121 and inputs $Y_1$-$Y_N$ to AND gate 122.

In the specific AND-OR-INVERT array of FIG. 6 there are nine AND gates 61-69, three of which have three inputs, three of which have four inputs and three of which have five inputs as shown. In the specific AND-OR-INVERT array of FIG. 7 there are seven AND gates 71-77, six of which have two inputs and one of which has three inputs as shown.

The generalized circuit of FIG. 12B includes Schottky-clamped NPN transistors $Q_X$ and $Q_Y$ corresponding to AND gates 121 and 122 of FIG. 12A. A plurality of diodes $D_X$ serve to isolate the inputs $X_1$-$X_N$ in connecting them to the base of transistor $Q_X$. Likewise diodes $D_Y$ serve to isolate the inputs $Y_1$, $Y_N$ in connecting them to the base of transistor $Q_Y$. The emitters of transistors $Q_X$ and $Q_Y$ are connected to ground and their collectors are connected in common at output node 120. Biasing resistor $R_{10}$ is connected between the node 120 and the V+ voltage source and base bias to transistors $Q_X$ and $Q_Y$ is supplied via resistors $R_X$ and $R_Y$ as shown. Preferably, the output logic swing is minimized by clamping the output node 120 with a Schottky diode $D_O$ and series epitaxial resistor $R_O$.

An important feature of the invention is made apparent by FIGS. 12A and 12B. It will be appreciated that the OR-INVERT gate 120 of FIG. 12A merely consists of the common collector node 120 of FIG. 12B. Therefore the OR-INVERT gate 120 of FIG. 12A and its counterpart gates 60 and 70 of FIGS. 6 and 7 are merely phantom gates which perform a NOR logic function but do not represent a gate delay in these circuits. In other words, the AND-OR-INVERT arrays of FIGS. 6 and 7 represent only one gate delay in generating the carry output terms $C_1$ and $C_2$.

Referring again to FIGS. 3-5, the NAND gates 31, 41 and 51 represent one gate delay, and the NOR gates 32, 42 and 52 represent slightly more than one gate delay. The Exclusive NOR gates 33, 43 and 53 represent only a fraction of a gate delay when, as mentioned above, they are implemented in accordance with the circuit 110 of FIG. 11B. The inverters 34, 44 and 54, which correspond to the transistor $Q_6$ in FIG. 11B, represent about one gate delay. Thus, the Exclusive OR terms XOR-1, XOR-2 and XOR-3 are generated in slightly more than one gate delay.

From the foregoing it will be apparent that the present invention enables a 3-bit binary number representing the sum of 6 binary inputs of equal weight to be generated in a total time of slightly more than two gate delays. Those skilled in the art will appreciate that the present invention can be adapted to add a plurality of binary inputs other than six in number and that multiple-input binary adders in accordance with the invention can be interconnected in arrays for rapid addition of partial products in high-speed multiplier circuits.

Another important advantage of the present invention is that the fan-in on the inputs is kept to a minimum. For example, the A-input drives gates 31, 32 and 33 in FIG. 3 and gates 64, 65 and 69 in FIG. 6. Likewise, the other five inputs B-F each drive only six gates.

Although a preferred embodiment of the invention has been described in detail, it is to be understood that modifications thereof are within the spirit and scope of the invention as defined by the appended claims.

What is claimed is:

1. In an integrated circuit device, a circuit for adding a plurality of binary inputs of equal weight to generate sum, first carry and second carry output terms representing a 3-bit binary number, the circuit comprising:

first circuit means responsive to the binary inputs for generating a plurality of intermediate output terms, the intermediate output terms including the NAND, NOR and Exclusive OR of first and second binary inputs and the NAND, NOR and Exclusive OR of third and fourth binary inputs;

second circuit means responsive to selected combinations of the intermediate output terms for generating the sum output term;

third circuit means responsive to selected combinations of the intermediate output terms and the binary inputs for generating the first carry output term; and fourth circuit means responsive to selected combinations of the intermediate output terms for generating the second carry output term.

2. The circuit of claim 1 wherein there are six binary inputs and wherein the first conduit means further comprises:

a first decoder responsive to the first and second binary inputs, a second decoder responsive to the third and fourth binary inputs, and a third decoder responsive to the fifth and sixth binary inputs, wherein each decoder includes 2-input NAND, NOR and Exclusive NOR gates, each of said gates being responsive to the respective binary inputs, each decoder further including an inverter responsive to the output of the respective Exclusive NOR gate, each said inverter and the respective Exclusive NOR gate together forming an Exclusive OR logic circuit.

3. The circuit of claim 2 wherein each of said Exclusive OR logic circuits comprises:

first, second, and third bipolar transistors, the collectors of the first and second transistors and the base of the third transistor being connected to a common node, the emitter of the first transistor being connected to one of the respective binary inputs, the emitter of the second transistor being connected to the other of the respective binary inputs; means for biasing the transistors;

first and second diodes, the first diode being connected between the base of the first transistor and the emitter of the second transistor, the second diode being connected between the base of the second transistor and the emitter of the first transistor;

whereby the collector of the third transistor defines the output of the Exclusive OR logic circuit and the common node defines the output of the respective Exclusive NOR gate.

4. The circuit of claim 2 wherein the third circuit means comprises a plurality of AND gates, each AND gate including a bipolar transistor having its emitter grounded and a plurality of diodes connected to its base responsive to selected combinations of the intermediate output terms and the binary inputs, and wherein the collector of each transistor is connected to a common node which defines the first carry output term.

5. The circuit of claim 4 wherein said plurality of AND gates comprises nine AND gates consisting of three 3-input AND gates responsive to selected combinations of the NAND and NOR outputs of the decoders, three 4-input AND gates responsive to selected combinations of the Exclusive OR outputs of the decoders and the binary inputs and three 5-input AND gates responsive to selected combinations of the NAND outputs of the decoders and the binary inputs.

6. The circuit of claim 2 wherein the fourth circuit means comprises a plurality of AND gates, each AND gate including a bipolar transistor having its emitter grounded and a plurality of diodes connected to its base responsive to selected combinations of the intermediate output terms and the binary inputs, and wherein the collector of each transistor is connected to a common node which defines the second carry output bit.

7. The circuit of claim 6 wherein said plurality of AND gates comprises seven AND gates consisting of six 2-input AND gates responsive to selected combinations of the NAND and NOR outputs of the decoders, and one 3-input AND gate responsive to the Exclusive OR outputs of the decoders.

* * * * *